(12) United States Patent
Kizaki et al.

(10) Patent No.: US 10,179,737 B2
(45) Date of Patent: Jan. 15, 2019

(54) SPHERICAL SILICON OXYCARBIDE PARTICLE MATERIAL AND MANUFACTURING METHOD THEREOF

(71) Applicant: JNC CORPORATION, Tokyo (JP)

(72) Inventors: Tetsuro Kizaki, Chiba (JP); Keizo Iwatani, Chiba (JP)

(73) Assignee: JNC CORPORATION, Tokyo (JP)

( * ) Notice: Subject to any disclaimer, the term of this patent is extended or adjusted under 35 U.S.C. 154(b) by 0 days.

(21) Appl. No.: 15/185,011

(22) Filed: Jun. 16, 2016

(65) Prior Publication Data

US 2016/0368776 A1 Dec. 22, 2016

(30) Foreign Application Priority Data

Jun. 18, 2015 (JP) .................................. 2015-122634

(51) Int. Cl.
*B24D 3/02* (2006.01)
*C09K 3/14* (2006.01)
(Continued)

(52) U.S. Cl.
CPC .......... *C01B 31/301* (2013.01); *C01B 32/907* (2017.08); *C03C 1/006* (2013.01); *C03C 3/045* (2013.01); *C03C 12/00* (2013.01); *C04B 35/5603* (2013.01); *C04B 35/65* (2013.01); *C08G 77/06* (2013.01); *C09K 3/1418* (2013.01); *C10M 103/02* (2013.01);
(Continued)

(58) Field of Classification Search
USPC .......................................... 51/307, 293, 309
See application file for complete search history.

(56) References Cited

U.S. PATENT DOCUMENTS

2006/0042171 A1* 3/2006 Radtke .................... C04B 35/52
  51/307
2014/0092360 A1* 4/2014 Zheng ...................... G02B 1/14
  351/159.57

FOREIGN PATENT DOCUMENTS

GB        2216535      10/1989
JP        H1045914      2/1998
(Continued)

OTHER PUBLICATIONS

Bakumov et al., "Emulsion Processing and Size Control of Polymer-Derived Spherical Si/C/O Ceramic Particles," Soft Materials, May 2007, pp. 287-299.

(Continued)

*Primary Examiner* — James E McDonough
(74) *Attorney, Agent, or Firm* — JCIPRNET

(57) ABSTRACT

Provided are spherical silicon oxycarbide particle material and manufacturing method thereof, wherein the average particle size is in the range of 0.1-100 μm and having a sphericity of 0.95-1.0.
Spherical silicon oxycarbide particle material and manufacturing method thereof are provided as follows. Organotrialkoxysilane is hydrolyzed in a pH 3-6 acetic acid aqueous solution, thereafter an alkaline aqueous solution such as a pH 7-12 ammonia water was added to the obtained hydrolysate. The condensation reaction is performed in an alkaline range to form spherical polysilsesquioxane particles that are spherical silicon oxycarbide precursors that has no melting point or softening point. Sintering was then performed at a sintering temperature of 600-1400° C. under inert atmosphere to obtain spherical silicon oxycarbide particle material.

6 Claims, 1 Drawing Sheet

(51) Int. Cl.

| | |
|---|---|
| *C01B 31/30* | (2006.01) |
| *C03C 1/00* | (2006.01) |
| *C03C 3/04* | (2006.01) |
| *C03C 12/00* | (2006.01) |
| *C08G 77/06* | (2006.01) |
| *C04B 35/56* | (2006.01) |
| *C04B 35/65* | (2006.01) |
| *C10M 103/02* | (2006.01) |
| *C01B 32/907* | (2017.01) |
| *B24D 3/00* | (2006.01) |
| *B24D 11/00* | (2006.01) |
| *B24D 18/00* | (2006.01) |

(52) U.S. Cl.
CPC ...... *C01P 2004/32* (2013.01); *C01P 2004/60* (2013.01); *C01P 2004/61* (2013.01); *C01P 2004/62* (2013.01); *C04B 2235/3895* (2013.01); *C04B 2235/483* (2013.01); *C10M 2201/10* (2013.01); *C10N 2230/06* (2013.01); *C10N 2250/08* (2013.01)

(56) References Cited

FOREIGN PATENT DOCUMENTS

| JP | 2000186148 | 7/2000 |
|---|---|---|
| JP | 2001192452 | 7/2001 |
| JP | 2003183396 | 7/2003 |
| JP | 2003335860 | 11/2003 |
| JP | 2007112693 | 5/2007 |

OTHER PUBLICATIONS

Tamayo et al., "Gradient pore size distributions in porous silicon oxycarbide materials," Journal of the European Ceramic Society, Mar. 2008, pp. 1871-1879.

Dire et al., "Preparation of Dense and Porous Silicon Oxycarbide Submicrometer-Sized Spheres Using a Modified Stober Process," Journal of the American Ceramic Society, Jul. 2011, pp. 3819-3824.

Jeong et al., "Preparation of Silicon Oxycarbide Amorphous Ceramics From Polymer Precursors and the Characterisation of Their High Temperature Stability," Journal of Ceramic Processing Research, Jun. 2012, pp. 239-242.

Ryan et al., "Tribology—Structure Relationships in Silicon Oxycarbide Thin Films," International Journal of Applied Ceramic Technology, Sep. 2010, pp. 675-686.

"Search Report of Europe Counterpart Application", dated Sep. 22, 2016, p. 1-p. 4.

"Office Action of Japan Counterpart Application", dated Oct. 23, 2018, with English translation thereof, p. 1-p. 7.

\* cited by examiner

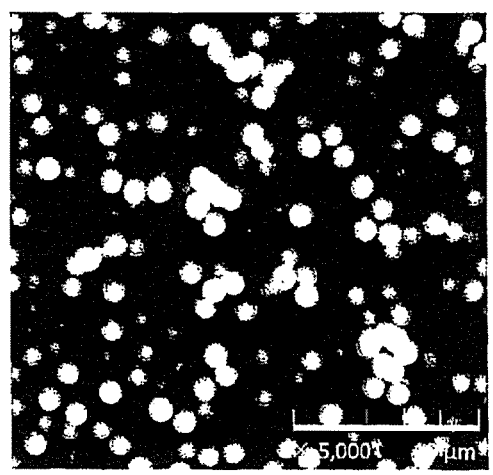

SPHERICAL SILICON OXYCARBIDE PARTICLE MATERIAL AND MANUFACTURING METHOD THEREOF

CROSS REFERENCE TO RELATED APPLICATIONS

This application claims the priority benefit of Japan application serial no. 2015-122634, filed on Jun. 18, 2015. The entirety of the above-mentioned patent application is hereby incorporated by reference herein and made a part of this specification.

BACKGROUND OF THE INVENTION

1. Field of the Invention

The present invention relates to a spherical silicon oxycarbide particle material and a manufacturing method thereof. In particular, to a silicon oxycarbide particle material that is used as a lubricant, an abrasive agent or a polymer additive.

2. Description of Related Art

Ceramics generally have the characteristics of excellent heat resistance, high hardness, being lighter than metal, excellent oxidation resistance, and in some cases, can have good solvent resistance, acid resistance or base resistance. Taking advantages of the characteristics and physical properties of ceramics, it has been widely used for many different purposes. In particular, for spherical ceramic particle materials, while having the characteristics of ceramics, the particles may take advantage of its spherical shape to provide improved functions as compared to conventional materials having unevenly distributed shapes and particles. Furthermore, it is also possible to use these spherical ceramic particles for a variety of different purposes. However, spherical ceramic particles are hard to manufacture, and the production cost is high, it is therefore not generally applied.

The present invention is particularly related to a spherical silicon oxycarbide (SiOC) particle material that is comparatively more uniform in particle size and may be sintered at low temperatures, and a manufacturing thereof. More specifically, the spherical silicon oxycarbide particle material may take advantages of the excellent characteristics and physical properties of ceramics, and be useful in solid lubricants, additive for lubricants, abrasive agents and polymer additives that are added to plastics (various fillers such as heat resistance fillers or conductive material fillers, filling agents or dispersion agents).

In the situations where the ceramic particle material are directly used as solid lubricants or abrasive agents, or used as lubricant additives that are added to grease, or used as additive for abrasive agents, or used as polymer additives that are added to plastics (abrasive agents, additives for abrasive agents, polymer additives, various fillers such as heat resistance fillers or conductive material fillers, filling agents or dispersion agents), the physical properties and characteristics such as the particle shape, particle size distribution, and the degree of aggregation of the ceramic particle material may affect the liquidity and formability, and ultimately, affects the uniformity of the molded product. Furthermore, it is well known that the expansion of the product, the contraction anisotropy, warpage or cracks will all have a great impact in affecting the properties of the product. In addition, a more inexpensive industrial production is desired.

More specifically, the particle material may be used as lubricants for lowering the friction coefficient of the sliding portion in various machines or devices such as internal combustion engines, machine tools, logistics machinery and electronic products. By lowering the friction coefficient, the performance of the lubricants may be improved. As such, an improvement in the operation efficiency with prolonged lifetime, in addition, with quietness or vibration reduction can be provided to the machines or devices. Furthermore, low fuel consumption and energy saving may be achieved. Since it is not easy and cheap to provide a ceramic used for lubricants with both particle shape and particle size distribution having the sufficient uniformity, the desired performance improvement is yet to be obtained.

In order to reduce friction of the sliding portion and to reduce energy loss, in the properties of abrasive materials to more precisely polish the surfaces of the sliding members, the bearing parts, and the sliding contact structure members, the five important properties of abrasive materials are hardness, toughness, wear resistance, particle size and particle shape. Furthermore, the particle material's particle shape, particle size distribution and degree of aggregation of the ceramic raw materials used to form the structural member will affect the performance of the product. Therefore, in order to obtain uniform spherical particles, the ceramic raw material is molded to form a product such that the surface roughness is homogenized, and thereby, the surface roughness can be reduced.

However, for surface abrasive agents and additives for abrasive agents, and also for the ceramic raw materials, a homogenous micro-sized ceramic particle material as the raw material being homogeneous in shape and particle size distribution has yet to be obtained. Furthermore, a simple and inexpensive method of manufacturing the ceramic particle material with the desired performance and physical properties has yet to be established.

For the ceramic particle material that are used as abrasive agents, lubricants or additives or alternatively, used as the raw material of the manufactured product, from the perspective of shape uniformity, particle size distribution uniformity and dispersibility, it is desired that the ceramic particle material used is a homogeneous particle material, and for the intended purpose to be spherical having no anisotropy in the micro-sized range. Conventionally, to obtain such ceramic particle material, an increased manufacturing process and a more precise process management are required, wherein the manufacturing cost is compensated.

As an example, a simple manufacturing method to obtain homogeneous ceramic particle material with high sphericity is described (patent document 1). The method includes obtaining spherical silicon carbide micro-particles by performing a sintering process of poly-organocarbosilane in an inert atmosphere at 1400 to 1600° C. Although the method can be used to obtain ceramic particles with high sphericity, the poly-organocarbosilane raw material is relatively expensive, and the device cost and running cost for performing the sintering process at 1400 to 1600° C. will also be a problem.

On the other hand, silicon oxycarbide (SiOC) has similar properties with silicon carbide. However, as a precursor of organic silicon polymers, the raw materials such as polysiloxane and polysilsesquioxane can be obtained at a cheaper price, wherein the sintering process temperature can be about 800-1200° C., which is economically more favorable.

The methods for obtaining spherical silicon oxycarbide particle material have been described (non-patent document 1-3).

In non-patent document 1, a method to obtain spherical silicon oxycarbide particles in the range of 10-100 μm is reported. However, in this method, the particle size distribution is wide and a problem exists where it contain cracks in the particle.

In non-patent document 2, a spherical silicon oxycarbide having uniform particle size is reported. However, in this method, the particles are connected together and have bad dispersibility, wherein if the particles are made to be single particles, this results in silicon oxycarbide micro-particles having low sphericity.

In non-patent document 3, spherical silicon oxycarbide micro-particles having no cracks or aggregation are reported. However, in this method, particles can only be obtained around 300 nm, wherein silicon oxycarbide particles controlled to have larger particle size has not yet been obtained.

In any of the described methods, spherical silicon oxycarbide particle material which are micro-sized particles useful for manufacturing products such as abrasives, lubricants or additives having a uniform particle size and no aggregation for obtaining a homogenous product cannot be obtained.

Patent Document

Patent Document 1: Japanese Laid Open Publication No. 2007-112693

Non-Patent Documents

Non-patent Document 1: Soft Materials, 4(2-4), 287 (2007)
Non-patent Document 2: J. Eur. Ceram. Soc., 28, 1871 (2008)
Non-patent Document 3: J. Am. Ceram. Soc., 94(11), 3819 (2011)

SUMMARY OF THE INVENTION

Problems to be Solved

In the present invention, in view of the problems encountered for the conventional ceramic particles described above, the aim of the present invention is to provide amorphous spherical silicon oxycarbide (SiOC) particle material and a manufacturing thereof, such that it may be useful as an abrasive agent and an additive thereof, a lubricant and an additive thereof, or be useful as polymer additives, or alternatively be useful as raw materials for manufacturing products such as machinery parts, wherein the particles are stable and dispersed, and having average particle sizes of more than 0.1 μm and less than 100 μm, as well as having no melting point or softening point.

Means for Solving the Problems

In order to achieve the above purpose, the inventors have discovered obtaining spherical silicon oxycarbide particle material as follows. A hydrolysate is formed by adding a hydrolysable alkoxysilane to an acidic solvent, and the solution is adjusted to be alkaline. In the alkaline environment, the hydrolysate undergoes a polycondensation reaction to obtain spherical silicon oxycarbide precursor particles. A process of sintering the spherical silicon oxycarbide precursor particle in an inert atmosphere was performed to obtain the spherical silicon oxycarbide particle material. In addition, the spherical silicon oxycarbide precursor particles prepared from the above method are spherical polysilsesquioxane, wherein the sphericity is high and there is no melting point or softening point, and through sintering, the spherical silicon oxycarbide particle material can be obtained. Based on these findings, this can lead to the completion of the present invention.

That is, the aim and task of the present invention can be accomplished through the following technical features.

[1] A manufacturing method of spherical silicon oxycarbide (SiOC) particle material including the following processes A to C.

Process A: forming a hydrolysate by adding an organotrialkoxysilane compound having the molecular structure represented by the following Formula (1) drop-wise to an aqueous medium that is adjusted to be acidic;

Process B: obtaining spherical silicon oxycarbide precursor particles having no melting point or softening point through a condensation reaction conducted by adding an alkaline solution to a solution containing the obtained hydrolysate under stirring, wherein the solution is adjusted to be alkaline; and Process C: performing a sintering process to the obtained spherical silicon oxycarbide precursor particles in an inert atmosphere at 600 to 1400° C.

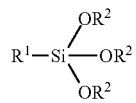

Formula (1)

In Formula (1), $R^1$ and $R^2$ each independently represents a group selected from a substituted or unsubstituted $C_1$ to $C_{20}$ alkyl group, a substituted or unsubstituted aryl group, or a substituted or unsubstituted arylalkyl group, and in the $C_1$ to $C_{20}$ alkyl group, any hydrogen may be substituted with halogen, any —$CH_2$— may be substituted with —O—, —CH=CH—, cycloalkylene or cycloalkenylene, and in the alkylene of the substituted or unsubstituted arylalkyl group, any hydrogen may be substituted with halogen, and any —$CH_2$— may be substituted with —O—, —CH=CH—, cycloalkylene or cycloalkenylene.

[2] Furthermore, in the present invention, for the manufacturing method of spherical silicon oxycarbide (SiOC) particle material, the forming of the hydrolysate is performed in the acidic aqueous medium that the pH of which is adjusted to 3-6.

[3] Furthermore, in the present invention, for the manufacturing method of spherical silicon oxycarbide (SiOC) particle material, the condensation reaction is performed while the pH of the solution containing the hydrolysate is adjusted to 7-12.

[4] Furthermore, in the present invention, for the manufacturing method of spherical silicon oxycarbide (SiOC) particle material, the spherical silicon oxycarbide precursor particles formed by the condensation reaction are spherical polysilsesquioxane having no melting point or softening point.

[5] Furthermore, in the present invention, for the manufacturing method of spherical silicon oxycarbide (SiOC) particle material, the acidic aqueous medium is an acetic acid aqueous solution.

[6] Furthermore, in the present invention, for the manufacturing method of spherical silicon oxycarbide (SiOC) particle material, the alkaline solution is aqueous ammonia.

[7] Furthermore, in the present invention, for the spherical silicon oxycarbide that is suitable to be made by the manufacturing method of spherical silicon oxycarbide (SiOC)

particle material of the invention, the silicon, the carbon and the oxygen content in total accounts for more than 98% of a composition of the spherical silicon oxycarbide (SiOC) particle material by elemental analysis, wherein the silicon content is 20-50%, the carbon content is 10-50%, the oxygen content is 20-50%, and the composition basically consist of Si, O and C, wherein if elements other than Si, C and O are detected, then hydrogen is the only other element detected, and the average particle size of the spherical silicon oxycarbide (SiOC) particle material is in the range of 0.1-100 µm, and wherein the sphericity is in the range of 0.95-1.0.

[8] In the present invention, a lubricant includes the spherical silicon oxycarbide (SiOC) particle material as a friction-reducing material.

[9] In the present invention, an abrasive agent includes the spherical silicon oxycarbide (SiOC) particle material as the abrasive agent or as an additive in the abrasive agent.

Effects of the Invention

In the present invention, spherical silicon oxycarbide particle materials being micro-sized ceramic particles with sphericity of more than 0.95, and wherein the particles have good uniformity and dispersibility and narrow distribution can be obtained. This is difficult to be obtained by conventional methods.

In the present invention, a relatively inexpensive method is provided, wherein the organoalkoxysilane is drop-wised added into the acidic aqueous solution and the hydrolysable silane is hydrolyzed to form the hydrolysate. In addition, the reaction system is adjusted to be alkaline, wherein the polycondensation reaction is performed under the alkaline environment to form polysilsesquioxane. By sintering the obtained polysilsesquioxane under an inert atmosphere, uniform spherical silicon oxycarbide particle material with micro-sized particles can be manufactured by a simple, inexpensive and efficient method. Furthermore, the method is provided such that the particle size of the formed particles may be more easily controlled during the manufacturing process. The particle size of the silicon oxycarbide particle material may be controlled through the modulation of the polysilsesquioxane precursor, through the acidity of the hydrolysis reaction, and through the basicity of the polycondensation reaction. Furthermore, it is possible to control the particle size by controlling the substrate concentration and stirring conditions.

In the spherical silicon oxycarbide particle material of the present invention, it has good sphericity, high hardness, and it also has excellent breaking strength. Therefore, it may be useful as an abrasive agent and an additive thereof, a lubricant and an additive thereof, or be useful as polymer additives, or alternatively be useful as raw materials for manufacturing machinery parts.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a scanning electron microscope image of the spherical silicon oxycarbide particle material manufactured in example 1.

DESCRIPTION OF THE EMBODIMENTS

For the hydrolysate used in the manufacturing method of the spherical silicon oxycarbide precursor particle, the hydrolysable organoalkoxysilane may be fully or partially hydrolyzed to form the hydrolysate.

For the hydrolysable organoalkoxysilane, it may be any silane having a hydrolysable group, for example, organoalkoxysilanes having hydrolysable groups such as halogen atoms or alkoxy groups may be listed.

Furthermore, for the hydrolysable organoalkoxysilane, in terms of high hydrolysis properties, it preferably has three hydrolysable groups, and more preferably, it is an organotrialkoxysilane having three alkoxy groups.

The hydrolysis of the hydrolysable organotrialkoxysilane is performed by known methods, for example, the reaction may be carried out at normal temperatures or with heating in a solvent such as alcohol or DMF, and in the presence of water and inorganic acids such as hydrochloric acid or organic acids such as acetic acid. Therefore, in the hydrolysate of the hydrolysable organotrialkoxysilane, other than having the hydrolysate of the hydrolysable organotrialkoxysilane, it may also contain substances derived from the solvent, acid and water.

Furthermore, for the hydrolysate of the hydrolysable organotrialkoxysilane, the hydrolysable organotrialkoxysilane may be completely hydrolyzed, or a portion of the hydrolysable group or a portion of the hydrolysable silane may be remained. During the hydrolysis process of the hydrolysable organotrialkoxysilane, other than performing the hydrolysis of the hydrolysable organotrialkoxysilane, a polycondensation process of the hydrolyzed hydrolysate is also partially carried out. Therefore, a certain degree of molecular chain is present in the hydrolysate.

Herein, the extent of hydrolysis reaction that proceeds may be controlled by the hydrolysis temperature, the hydrolysis time, the usage amount of inorganic acid or organic acid, and/or the solvent. For example, the parameters may be appropriately set in accordance with the silicon oxycarbide particles of interest as described below.

In addition, in the manufacturing method of the silicon oxycarbide (SiOC) particle material that uses the organotrialkoxysilane, the rate of the hydrolysis reaction and the condensation reaction may vary depending on the pH. In certain regions, although the hydrolysis rate is faster than the condensation reaction to form partial condensate, a polymer having no melting point and softening point cannot be formed. Furthermore, in regions where the condensation reaction reacts faster than the hydrolysis reaction, since the hydrolysate will quickly condense, it would be difficult to obtain a single spherical particle having a uniform particle size. Although the reaction temperature is not particularly limited, it is well known that it will affect the reaction speed. In addition, adding organotrialkoxysilane into water and performing hydrolysis reaction with heating is also known.

In the present invention, the hydrolysable organotrialkoxysilane is hydrolyzed to obtain the silicon oxycarbide precursor particles of interest, generally, through a one-pot reaction of a homogenous solution that can be easily performed. The organotrialkoxysilane is hydrolyzed in an acidic aqueous solution, wherein a silanol of the hydrolysate product aqueous solution is formed, and an alkaline aqueous solution was added therein so that the solution is changed to become alkaline. Subsequently, a homogenously dispersed polysilsesquioxane particle solution is formed through a condensation reaction of the silanol of the hydrolysate product. A system is adopted where the hydrolysis occurs in the aqueous solution, and where the condensation reaction is carried out.

In the manufacturing method of the present invention, by considering the reaction time and safety of the hydrolysis reaction, it is preferred that the hydrolysable organotrialkoxysilane is added drop-wise to the reaction system slowly under room temperature. In addition, during the condensation reaction, since mild conditions are desirable for obtaining single spherical particle with a uniform particle size, a reaction performed near room temperature under alkaline conditions is preferred.

Next, the manufacturing method of the spherical silicon oxycarbide (SiOC) particle material of the present invention will be described in detail.

Process A: <the Formation of the Hydrolysate of Hydrolysable Organoalkoxysilane>

In the manufacturing method of the spherical silicon oxycarbide (SiOC) particle material of the present invention, the hydrolysis of the organoalkoxysilane is first performed (process A). In the hydrolysis reaction, under room temperature and with continuous stirring of the acidic aqueous solution, the organotrialkoxysilane is slowly added thereto, wherein the parameters such as addition rate, dropping amount and addition time were controlled such that the temperature conditions of the reaction system that depends on the exothermic reaction of the hydrolysis reaction does not change significantly. Thereafter, a solution including the organotrialkoxysilane hydrolysate product is obtained.

The alkoxysilane used in the manufacturing the silicon oxycarbide (SiOC) particle material of the present invention is an organotrialkoxysilane that is represented by the Formula (1) $R^1Si(OR^2)_3$. In Formula (1), $R^1$ and $R^2$ each independently represents a group selected from a substituted or unsubstituted $C_1$ to $C_{20}$ alkyl group, a substituted or unsubstituted aryl group, or a substituted or unsubstituted arylalkyl group. However, in the $C_1$ to $C_{20}$ alkyl group, any hydrogen may be substituted with halogen, any —$CH_2$— may be substituted with —O—, —CH=CH—, cycloalkylene or cycloalkenylene. In the alkylene of the substituted or unsubstituted arylalkyl group, any hydrogen may be substituted with halogen, and any —$CH_2$— may be substituted with —O—, —CH=CH—, cycloalkylene or cycloalkenylene.

Specific examples of the organotrialkoxysilane of the present invention are such as, methyl trimethoxysilane, methyl triethoxysilane, ethyl trimethoxysilane, n-propyl trimethoxysilane, i-propyl trimethoxysilane, n-butyl trimethoxysilane, s-butyl trimethoxysilane, t-butyl trimethoxysilane, phenyl trimethoxysilane, phenyl triethoxysilane, 2-phenylethyl trimethoxysilane, 2-cyanoethyl trimethoxysilane, γ-glycidoxypropyl trimethoxysilane, vinyl trimethoxysilane.

These organotrialkoxysilane may be used alone, or may be used in a combination of two or more. Out of these organotrialkoxysilane, methyl trimethoxysilane and phenyl trimethoxysilane that may be easily obtained are most preferable.

In the hydrolysis process of the present invention, the reaction takes place under the pH range where the hydrolysis rate is faster than the polycondensation reaction rate. The pH ranges where the hydrolysis rate is faster than the polycondensation reaction rate will vary depending on the organotrialkoxysilane used. Typically, it is in the range of pH 3-6, and preferably, it is often adjusted to pH 4-6. In such degree of acidity, this will affect the balance between the formation of the hydrolysate, the reaction time or the amount/condensation number of the partial condensate etc. However, it will not have a great effect on the particle size.

The acids that may be used for this pH range are such as organic acids or inorganic acids. More specifically, organic acids are such as formic acid, acetic acid, propionic acid, oxalic acid or citric acid, whereas inorganic acids are such as hydrochloric acid, sulfuric acid, nitric acid or phosphoric acid. Acetic acid is the most preferable wherein the hydrolysis reaction and the polycondensation reaction may be easily controlled and carried out, and where acetic acid can be easily obtained and used for adjusting pH. In the present invention, in the situation where a dilute acetic acid aqueous solution is used, the solution for the hydrolysate of the organotrialkoxysilane will have a pH value of 5.0-5.8.

Process B: <Formation of Silicon Oxycarbide Precursor Particle Through Polycondensation Reaction>

In the present invention, the polycondensation process is where the polycondensation reaction rate is faster than the hydrolysis rate. Specifically, the hydrolysate of the organotrialkoxysilane formed by hydrolysis in the hydrolysis process (process A) is continuously stirred and an alkaline aqueous solution is added thereto. The reaction system is adjusted to be alkaline to undergo the polycondensation reaction. Thereafter, a spherical silicon oxycarbide precursor particle having no melting point or softening point with uniform particle size is formed. In this polycondensation process, it is preferable that the solution of the hydrolysate of the hydrolysable organotrialkoxysilane obtained from the hydrolysis process is kept in such a state, such that the solution is continuously used in the polycondensation reaction.

In the condensation reaction of the polycondensation process of the present invention, the reaction takes place in a pH range where the condensation reaction rate is faster than the hydrolysis rate. The condensation rate of the condensation reaction will vary depending on the organotrialkoxysilane used. Typically, it is in the range below pH 3, or more often in the range above pH 7. In the specified range, in order to obtain single spherical particle with a uniform particle size, the pH is preferably adjusted to 7-12. With such alkaline strength, the obtained particle size becomes smaller. Furthermore, when the substrate concentration becomes higher, the degree of polymerization will rise and the obtained particle size becomes larger.

The alkaline substance used to adjust the pH to the range of pH 7-12 are generally metal hydroxides selected from group Ia, group IIa of the periodic table, oxides, carbonates or organic nitrogen compounds and ammonia. Ammonia is the most preferable since it is easy to remove after the reaction. The ammonia that can be used is such as commercially available ammonia water having a concentration of 28% by weight. The ammonia water can be appropriately diluted to about 2 to 100 times as required. In the present invention, when ammonia water is used as the alkaline aqueous solution, the acidic pH range including the hydrolysate product the will turn to have a pH value of 7.8-10.1 in the final reaction system. As such, a solution can be obtained where the spherical polysilsesquioxane particles are uniform and in a well dispersed state.

During the hydrolysis reaction or the polycondensation reaction of the present invention, it is known that by changing the stirring speed or solvent addition speed, this will affect the shape, size and particle size distribution of the formed spherical particles.

The spherical polysilsesquioxane particles synthesized in this way are then filtered and separated using a filter having an opening of 0.1-1.0 μm. In some cases, the precursor of the spherical silicon oxycarbide particle material is obtained after washing with water or washing with organic solvents and dried thereafter.

Process C: <Sintering the Precursor of the Spherical Silicon Oxycarbide (SiOC) Particle Material>

In the sintering process of the present invention, the precursor of the spherical silicon oxycarbide particle material prepared and formed by the polycondensation process (process B) is sintered to form the spherical silicon oxycarbide particle material under an inert atmosphere.

For the spherical silicon oxycarbide (SiOC) particle material of the present invention, it does not melt even above the decomposition temperature (around 300° C.). The sintered particle of the polysilsesquioxane particles are formed to have no melting point or softening point.

In the sintering process (process C) of the present invention, the inert atmosphere for sintering is where the process is carried out in an atmosphere without oxygen. If the sintering is performed in an oxygen atmosphere, then carbon is oxidized and being lost as carbon dioxide, and by forming silicon dioxide, the sintered particles of silicon oxycarbide cannot be obtained.

The gases that may be used for the inert atmosphere of the present invention are such as nitrogen, argon or helium. In addition, without using inert gas, the sintering may also be performed in an atmosphere where oxygen is removed by high vacuum.

The sintering temperature of the present invention is the temperature where the polysilsesquioxane is dehydrogenated to form silicon oxycarbide. If the sintering temperature is too low, then the dehydrogenation may easily become insufficient, wherein the hardness and strength are undesirable. In addition, the dehydrogenation reaction will take a longer time, hence, leading to an increased cost which is also undesirable. If the sintering temperature is too high, then combustion of the oxygen and carbon in the alkoxysilane may occur to have $CO_2$ or $H_2O$ as leaving groups, thereby the compound is transformed into silicon carbide or silicon oxide, wherein silicon oxycarbide cannot be obtained.

It is preferable that the sintering temperature is around 600-1400° C. It is not particularly limited if the temperature is controlled within this range, however, the sintering temperature is preferably 900-1300° C., and more preferably 1000-1200° C.

As for the sintering speed, it is preferable that no heat shock or cracks are conferred to the precursor and the sintered product such that the temperature is slowly raised and slowly lowered during sintering. However, from the view point of cost and production efficiency, the speed is not lowered to what is more than necessary. Herein, the heating and cooling speed is preferably 4-10° C./minute, and more preferably 4-6° C./minute.

In the present invention, if these manufacturing process conditions are reasonably applied, then nano-ordered fine particles are formed, and the primary particles are then aggregated, wherein the entire solution is not gelled, such that the desired spherical micro-sized particles can be obtained.

The micro-sized silicon oxycarbide (SiOC) particle materials of the present invention are spherical silicon oxycarbide having an average particle size in the range of 0.1-100 μm and with sphericity in the range of 0.95-1.0. If the average particle size of the particle material is above 0.1 μm, then without aggregation, the manufacturing process of the spherical ceramic particles can be simplified such that the distribution processing for preventing the irregular shape caused by sintering spherical particle materials may be unnecessary.

If the sphericity is smaller than 0.95, then when used as lubricants or abrasives, the roughing of the surface, lowering of the lubricity and increasing wear due to the contacts between particles will occur, such that the deterioration is accelerated, additionally, when used as the product materials, then a good quality sintered product cannot be obtained such that the relative density of the molded product becomes lower, and a non-uniform density and roughened surface will occur.

In the present invention, the "sphericity" can be determined by using a scanning electron microscope (SEM) to observe the image, and by using an image analysis software (for example, Mac-View made by Mountech Co., Ltd.) for analysis. In such image analysis software, a plurality of non-overlapping particles was randomly selected as samples from the SEM image, wherein the cross sectional area and circumference of the particles in the SEM image was determined, and from the mean of these values, a "circularity coefficient" can be automatically calculated and provided by the program. Herein, the "circularity coefficient" can be used to refer to the "sphericity" of the present invention.

In the silicon oxycarbide (SiOC) particle material of the present invention, the silicon, the carbon and the oxygen content in total accounts for more than 98% of the composition by elemental analysis, wherein the spherical silicon oxycarbide particle material has a silicon content of 20-50%, a carbon content of 10-50%, and an oxygen content of 20-50%. Preferably, the spherical silicon oxycarbide particle material has a silicon content of 30-50%, a carbon content of 10-30% and an oxygen content of 30-50%. The composition basically consist of Si, O and C, wherein if elements other than Si, C and O are detected, then hydrogen is the only other element detected, and wherein the hydrogen is generally in an amount of 0.5% or less and being at most 1.2%. Nitrogen is below the detection limit.

The manufacturing method of the silicon oxycarbide (SiOC) particle material of the present invention is as follows. In an acidic aqueous solution that is continuously stirred, small amounts of organotrialkoxysilane is continuously added thereto, wherein the organotrialkoxysilane is hydrolyzed to form a solution containing the hydrolysate product. Thereafter, an alkaline solution was added to the solution containing the hydrolysate product so that the solution is adjusted to be alkaline. By performing a condensation reaction, the spherical polysilsesquioxane particles being silicon oxycarbide precursors can be formed. After complete reaction and filtering, spherical polysilsesquioxane particles having no melting point and softening point is obtained. By performing a sintering process, an amorphous spherical silicon oxycarbide (SiOC) particle material having good sphericity is obtained.

In the manufacturing method of the present invention, a spherical silicon oxycarbide particle material can be obtained by a stable, simple and inexpensive method, wherein the micro-sized particle material has an average particle size of 0.1-100 μm and a sphericity of above 0.95.

In this way, according to the manufacturing method of the silicon oxycarbide (SiOC) particle material of the present invention, a silicon oxycarbide particle material can be obtained wherein a wide variety of shape is controlled, aggregation does not occur between particles and wherein the spherical particle is well dispersed.

EXAMPLES

Examples and comparative examples will be presented below. Although the present invention is more specifically described in detail, the present invention is not limited by way of these examples.

In the following example, the polysilsesquioxane sintered product as the silicon oxycarbide is prepared by examples 1-9 and comparative examples 1-3, and the following analysis and evaluation was performed.

The measuring method and device used in the "average particle size measurement", "elemental analysis measurement", "SEM observation measurement" and "shape distribution measurement" for the examples and comparative examples are described in detail below.

(Average Particle Size Measurement)

In a dispersant having three drops of surfactants (Stamina gel Sassa made by Kaneyo soap, Inc) in 50 mL of pure water, 30 mg of a black particle material sintered particle was added thereto. Thereafter, the dispersion was dispersed by using ultrasonic irradiation for 5 minutes and measured using a laser diffraction particle size distribution measuring apparatus (LS 230 made by Beckman Coulter, Inc.). In the particle size distribution measurement, the average particle size, standard deviation and variation coefficient of the obtained silicon oxycarbide (SiOC) particle material can be measured.

(Elemental Analysis Measurement)

For the elemental analysis of silicon, an ICP emission spectroscopy method through a silicon analyzing device such as ICAP 6500 DUO VIEW made by THERMO SCIENTIFIC was used for analysis. For the elemental analysis of carbon, an IR absorption method through a carbon analyzing device such as LC-LS600 made by LECO was used for analysis. For the elemental analysis of oxygen, a high temperature carbon reaction ND-IR detection method through an oxygen analyzing device such as EMGA-920 by HORIBA Ltd. was used for analysis. As such, elemental analysis was performed respectively.

(SEM Observation)

The obtained black powder was fixed onto a support by using a carbon double-sided tape (NEW TAPE made by Nisshin EM, Inc.) for scanning electron microscopy (SEM). The scanning electron microscope (Microscope TM-1000 made by Hitachi, Ltd., Inc.) was used under suitable conditions of an accelerating voltage of 15 KV, a measurement magnification of 1000-10000 times to obtain a SEM image, and the results are observed (FIG. 1).

(Shape Distribution Measurement)

From the observed image obtained by the scanning electron microscope (SEM), 50 non overlapping particles was randomly selected as samples, and analyzed using an image analysis software (Mac-View made by Mountech Co., Ltd.), wherein the cross sectional area and circumference of the particles were obtained and the circularity coefficient (sphericity) was calculated.

(Crushing Test)

In sample 1 and sample 2, for five particles with particle size in the range of 9.1-10.9 μm as test particles, a micro compression testing machine (MCT-510 made by Shimadzu Corporation) was used to perform the crushing test, and the mean value was evaluated. The breaking strength is calculated using the following formula.

The measurement conditions are with a testing force of 490 mN, a loading rate of 9.6841 mN/sec, and by using a top pressure indenter having a planar surface with 20 μm diameter, and a bottom pressure plate where trace amounts of the samples are spread thereon, and wherein the compression test of the particles was performed one by one thereafter.

$Cs = 2.48 \, P/\pi d^2$

Cs: breaking strength (MPa)
P: break testing force (N)
d: particle size (mm)

Example 1

Preparation of Silicon Oxycarbide Precursor (Synthesis)

222.9 g of a pH 5.3 acetic acid aqueous solution adjusted to 1.3 ppm by weight was added to a 500 mL four-necked flask under continuous stirring, wherein a mixture of 27.24 g of methyl trimethoxysilane (0.200 mol) and 9.91 g of phenyl trimethoxysilane (0.050 mol) was drop-wise added thereto. After drop-wise addition and stirring at room temperature for 2 hours, 7.90 g of a 0.37% by weight ammonia water was added drop-wise to the solution with stirring, wherein the pH of the solution becomes 9.5. After drop-wise addition and further stirring at room temperature, stirring was stopped, and the solution was left to stand overnight.

The obtained cloudy liquid of polysilsesquioxane was filtered through a 100 mesh wire netting and filtered through a membrane filter with an opening of 1 micrometer under suction to obtain 19.34 g of spherical polysilsesquioxane.

(Preparation of Silicon Oxycarbide (SiOC) Sintered Product)

8.01 g of polysilsesquioxane was placed in an alumina boat, and the boat was placed in a tubular furnace (KFT433N1 made by Koyo Thermo System, Inc.), wherein argon gas was distributed thereto (flow rate 200 mL/min), the temperature was raised to 1200° C. at a speed of 4° C./min, sintering was performed at 1200° C. for 5 hours, and the temperature was lowered to room temperature with a cooling speed of 4° C./min to obtain a black powder. The weight of the black powder was 5.52 g.

The particle size distribution measurement of the obtained black powder revealed a sharp peak, wherein the average particle size is 1.75 μm, the standard deviation is 0.47 μm and the variation coefficient is 26.9%. Observation from the SEM confirmed that beautiful spherical polysilsesquioxane sintered particles was obtained. The SEM image is presented in FIG. 1.

Furthermore, the measurement results from elemental analysis revealed 40.8% by weight of silicon, 23.2% by weight of carbon and 34.3% by weight of oxygen. The results from shape distribution measurement revealed a circularity coefficient (sphericity) of 0.96.

Examples 2-6

Besides adjusting the amount of the 1.3 ppm acetic acid aqueous solution with pH 5.3 and the amount of 0.37% by weight ammonia water used in example 1, and adjusting the pH and reacting conditions according to Table 1, the spherical polysilsesquioxane and polysilsesquioxane sintered particles are obtained by conducting the same procedures described in Example 1.

The particle size distribution measurement, circularity coefficient (sphericity) and elemental analysis measurement results for the obtained spherical polysilsesquioxane sintered particles are presented in Table 1.

Example 7

Besides sintering the spherical polysilsesquioxane particles obtained by the reaction conditions used in Example 6 in Table 1 at 1000° C., the spherical polysilsesquioxane sintered particles are obtained by conducting the same procedures in Example 6.

Example 8

Besides sintering the spherical polysilsesquioxane particles obtained by the reaction conditions used in Example 6 in Table 1 at 1400° C., the spherical polysilsesquioxane sintered particles are obtained by conducting the same procedures in Example 6.

Example 9

Preparation of Silicon Oxycarbide Precursor (Synthesis)

458.0 g of a pH 5.3 acetic acid aqueous solution adjusted to 1.3 ppm by weight was added to a 1000 mL four-necked flask under continuous stirring, wherein 66.11 g (0.500 mol) of methyl trimethoxysilane was drop-wise added thereto. After drop-wise addition and stirring at room temperature for 2 hours, 16.08 g of a 0.37% by weight ammonia water was added drop-wise to the solution with stirring, wherein the pH of the solution becomes 9.3. After drop-wise addition and further stirring at room temperature, stirring was stopped, and the solution was left to stand overnight.

The obtained cloudy liquid of polysilsesquioxane was filtered through a 100 mesh wire netting and filtered through a membrane filter with an opening of 1 micrometer under suction to obtain 33.83 g of spherical polysilsesquioxane precursor.

(Preparation of Silicon Oxycarbide (SiOC) Sintered Product)

15.02 g of spherical polysilsesquioxane precursor particle was placed in an alumina boat, and the boat was placed in a tubular furnace (KFT433N1 made by Koyo Thermo System, Inc.), wherein argon gas atmosphere was distributed thereto (flow rate 200 mL/min), sintering was performed at 1200° C. for 5 hours to obtain a black powder. The weight of the black powder was 13.10 g.

The particle size distribution measurement of the obtained black powder revealed an average particle size of 6.69 μm, a standard deviation of 2.01 μm and a variation coefficient of 30.0%. The shape distribution measurement results revealed a circularity coefficient (sphericity) of 0.98. Furthermore, the elemental analysis measurement results revealed 45.5% by weight of silicon, 11.8% by weight of carbon and 41.8% by weight of oxygen. As same as FIG. 1, observation from the SEM confirmed that beautiful spherical polysilsesquioxane sintered particles was obtained. For the sintered particles of the present invention, the composition by elemental analysis basically consist of Si, O and C, wherein if elements other than Si, C and O are detected from elemental analysis, then hydrogen is the only other element detected, and wherein the hydrogen is generally in an amount of 0.5% or less and being at most 1.2%. Nitrogen is below the detection limit.

Comparative Example 1

222.9 g of a 3.6% by weight hydrochloric acid aqueous solution was added to a 500 mL four-necked flask under continuous stirring, wherein a mixture of 27.24 g (0.200 mol) of methyl trimethoxysilane and 9.91 g (0.050 mol) of phenyl trimethoxysilane was drop-wise added thereto. After continuous stirring under room temperature, a bulk mass of polysilsesquioxane was obtained. After crushing the bulk mass, the SEM observation results revealed that spherical and non-spherical polysilsesquioxane agglomerates were obtained.

Comparative Example 2

222.9 g of a 0.37% by weight ammonia water was added to a 500 mL four-necked flask under continuous stirring, wherein a mixture of 27.24 g (0.200 mol) of methyl trimethoxysilane and 9.91 g (0.050 mol) of phenyl trimethoxysilane was drop-wise added thereto, and a bulk mass of polysilsesquioxane was obtained. After crushing the bulk mass, the SEM observation results revealed that the spherical particles of approximately 1 μm in size are strongly adhered together. In order to carry out particle size distribution measurement, ultrasonic irradiation was used for dispersing the particles. However, it was impossible to loosen the particles by using ultrasonic, and if trying to loosen the particles by force, spherical particles are not obtained and become cracked, wherein a bulk mass of polysilsesquioxane was confirmed.

Comparative Example 3

200 mL of toluene and 22.9 g of 1 mol/L of a 3.6% by weight hydrochloric acid aqueous solution was added to a 500 mL four-necked flask under continuous stirring, wherein a mixture of 27.24 g (0.200 mol) of methyl trimethoxysilane and 9.91 g (0.050 mol) of phenyl trimethoxysilane was drop-wise added thereto. After continuous stirring under room temperature for 2 hours, the solution was neutralized by sodium hydrogen carbonate, and the organic layer was washed with 50 mL of pure water. By removing the solvent of the organic layer using an evaporator, a bulk mass of non-spherical polysilsesquioxane was obtained, wherein the melting point thereof is 118° C. The polysilsesquioxane was dissolved in toluene, and spray-dried to form spherical

TABLE 1

| Conditions | | Example 1 | Example 2 | Example 3 | Example 4 | Example 5 | Example 6 | Example 7 | Example 8 | Example 9 |
|---|---|---|---|---|---|---|---|---|---|---|
| Acetic acid aqueous solution (g) | | 222.9 | 222.9 | 222.9 | 111.5 | 111.5 | 1115 | 1115 | 1115 | 458.0 |
| Ammonia water (g) | | 7.90 | 3.95 | 3.04 | 7.90 | 3.95 | 39.53 | 39.53 | 39.53 | 16.08 |
| Average particle size | | 1.75 | 4.44 | 7.08 | 4.44 | 19.8 | 10.75 | 10.75 | 10.75 | 6.69 |
| Variation coefficient | | 26.9 | 25.9 | 28.8 | 28.6 | 28.4 | 30.0 | 30.0 | 30.0 | 30.0 |
| Circularity coefficient | | 0.96 | 0.96 | 0.97 | 0.96 | 0.95 | 0.95 | 0.95 | 0.95 | 0.96 |
| $pH_1$ Acidity | | 5.3 | 5.3 | 5.3 | 5.3 | 5.3 | 5.3 | 5.3 | 5.3 | 5.3 |
| $pH_2$ alkalinity | | 9.5 | 8.6 | 7.8 | 10.1 | 9.4 | 9.5 | 9.5 | 9.5 | 9.3 |
| Elemental analysis | Si (% by weight) | 40.8 | 41.1 | 40.3 | 40.4 | 42.0 | 42.0 | 41.0 | 44.0 | 45.5 |
| | C (% by weight) | 23.2 | 23.2 | 23.6 | 24.8 | 23.7 | 23.3 | 23.9 | 24.4 | 11.8 |
| | O (% by weight) | 34.3 | 34.0 | 34.1 | 33.1 | 33.0 | 33.1 | 33.1 | 31.0 | 41.8 |
| Total | | 98.3 | 98.3 | 98.0 | 98.3 | 98.7 | 98.4 | 98.0 | 99.4 | 99.1 | particles. Thereafter, 12.89 g of spherical polysilsesquioxane was placed in an alumina boat, and the boat was placed in a tubular furnace (KFT433N1 made by Koyo Thermo System, Inc.), wherein argon gas atmosphere was distributed thereto (flow rate 200 mL/min), and sintering was performed at 1200° C. for 5 hours. The polysilsesquioxane first becomes melted and becomes irregular shaped, since the particles are converted into silicon oxycarbide under a thermally decomposed state, spherical silicon oxycarbide sintered particles cannot be obtained.

Spherical polysilsesquioxane sintered particles are important for use as abrasive particles, lubricants or polymer additives. Regarding the breaking strength, the particle materials obtained in example 6 and the particle materials obtained in example 8 are used for performing the crushing test, and the breaking strengths are evaluated. The results are presented in Table 2. From the test results, it can be seen that even if the particle size is around the same, if the sintering temperature is higher, then a compressive strength is greatly reduced. It is speculated that this may be due to a partial formation of SiC during sintering at 1400° C., wherein a portion of the SiC tend to make the spherical particles more fragile.

TABLE 2

| Sample name | Particle size (µm) | Break testing force (mN) | Breaking strength (MPa) |
|---|---|---|---|
| Example 6 | 10.0 | 284.0 | 2233.4 |
| Example 8 | 9.8 | 190.9 | 1565.0 |

(Qualitative Test of Lubricity)

A simple qualitative test of lubricity was performed on the particle material obtained in example 1 and the crushed product obtained in comparative example 1 and 2. For the qualitative test, at one side of a quartz plate that is 20 cm in length, a 3 cm high inclined plane was made, wherein a dish having a diameter of 3 cm was placed on the inclined plane without movement. Next, the particle material of example 1 was evenly spread onto the quartz plate and in the place where the dish is placed, wherein the dish slid down the inclined plane instantly.

Similarly, the crushed products of comparative example 1 and 2 were evaluated in the same way, wherein no movement was observed for the dish at all.

Since the sintered particle of the silicon oxycarbide (SiOC) particle material has a spherical shape, the flow resistance is smaller due to the spherical surface, wherein the frictional properties are low, and lubricity can be conferred. Furthermore, regarding the hardness, although the silicon oxycarbide particle material has a hardness of 22.0 GPa that is comparatively lower, it still has the required hardness for being an abrasive agent, lubricant or additive. Besides, the silicon oxycarbide particle material has a large breaking strength, and is hard to crack, and the spherical shape is unlikely to cause frictional wear on each other, such that it smoothly slides during contact, and is strong against breaking, therefore, the sintered particle can be used as excellent abrasive particles, lubricants or additives.

Regarding the manufacturing method of silicon oxycarbide particle material, as the alkaline basicity becomes stronger, the particle size will become smaller, and if the substrate concentration of the hydrolysate product of organotrialkoxysilane is increased, then the particle size will become larger. In addition, the stirring intensity and speed may also affect the size of the particles, wherein it is known that larger particles are formed with stronger stirring, while smaller particles are formed with weaker stirring. By using the manufacturing method of the present invention, micro-sized spherical silicon oxycarbide (SiOC) particle material that cannot be obtained conventionally can be controlled and be produced by using inexpensive raw materials in a simple one-pot reaction, and be used as abrasive agents, lubricants or polymer additives.

INDUSTRIAL APPLICABILITY

In the present invention, the micro-sized spherical silicon oxycarbide (SiOC) particle material can be controlled and be manufactured through a simple and inexpensive method. Additionally, the physical properties of the silicon oxycarbide particles such as hardness, friction coefficient, sphericity may be appropriately altered, and be used in a wide variety of fields. More specifically, it may be used as an additive in materials or the particle material itself may be used as lubricants, or abrasive agents, or alternatively be used as fillers, lubricants, reinforcing materials that are added to polymers.

What is claimed is:

1. A manufacturing method of spherical silicon oxycarbide (SiOC) particle material comprising the following processes A to C:

process A: forming a hydrolysate by adding an organotrialkoxysilane compound having the molecular structure represented by the following Formula (1) dropwise to an aqueous medium that is adjusted to be at pH 5.0-5.8, wherein the aqueous medium is an acetic acid aqueous solution;

process B: obtaining spherical silicon oxycarbide precursor particles having no melting point or softening point through a condensation reaction conducted by adding an alkaline solution to a solution containing the obtained hydrolysate under stirring, wherein the solution is adjusted to be alkaline, wherein the condensation reaction is performed while the pH is adjusted to 7.8-10.1; and process C: performing a sintering process to the obtained spherical silicon oxycarbide precursor particles in an inert atmosphere at 600 to 1400° C.,

Formula (1)

wherein in Formula (1), $R^1$ and $R^2$ each independently represents a group selected from a substituted or unsubstituted $C_1$ to $C_{20}$ alkyl group, a substituted or unsubstituted aryl group, or a substituted or unsubstituted arylalkyl group, and in the $C_1$ to $C_{20}$ alkyl group, any hydrogen may be substituted with halogen, any —$CH_2$— may be substituted with —O—, —CH=CH—, cycloalkylene or cycloalkenylene, and in the alkylene of the substituted or unsubstituted arylalkyl group, any hydrogen may be substituted with halogen, and any —$CH_2$— may be substituted with —O—, —CH=CH—, cycloalkylene or cycloalkenylene.

2. The manufacturing method of spherical silicon oxycarbide (SiOC) particle material according to claim 1, wherein the spherical silicon oxycarbide precursor particles are spherical polysilsesquioxane having no melting point or softening point.

3. The manufacturing method of spherical silicon oxycarbide (SiOC) particle material according to claim 1, wherein the alkaline solution is aqueous ammonia.

4. A spherical silicon oxycarbide (SiOC) particle material manufactured by the manufacturing method of spherical silicon oxycarbide (SiOC) particle material according to claim 1, wherein the silicon, the carbon and the oxygen content in total accounts for more than 98% of a composition of the spherical silicon oxycarbide (SiOC) particle material by elemental analysis, wherein the silicon content is 20-50%, the carbon content is 10-50%, the oxygen content is 20-50%, and the composition basically consist of Si, O and C, wherein if elements other than Si, C and O are detected, then hydrogen is the only other element detected, the average particle size of the spherical silicon oxycarbide (SiOC) particle material is in the range of 1.75-100 μm, and wherein the sphericity is in the range of 0.95-1.0.

5. A lubricant, comprising the spherical silicon oxycarbide (SiOC) particle material according to claim 4 as a friction-reducing material.

6. An abrasive agent, comprising the spherical silicon oxycarbide (SiOC) particle material according to claim 4 as the abrasive agent or as an additive in the abrasive agent.

* * * * *